M. J. SELZER.
WHEEL RIM.
APPLICATION FILED MAY 16, 1912.
1,161,348.
Patented Nov. 23, 1915.
2 SHEETS—SHEET 2.
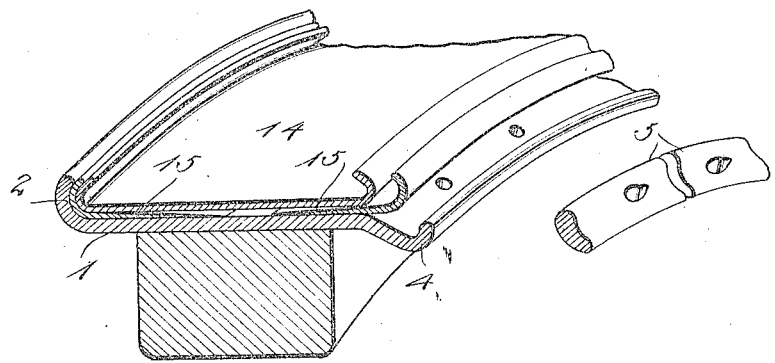
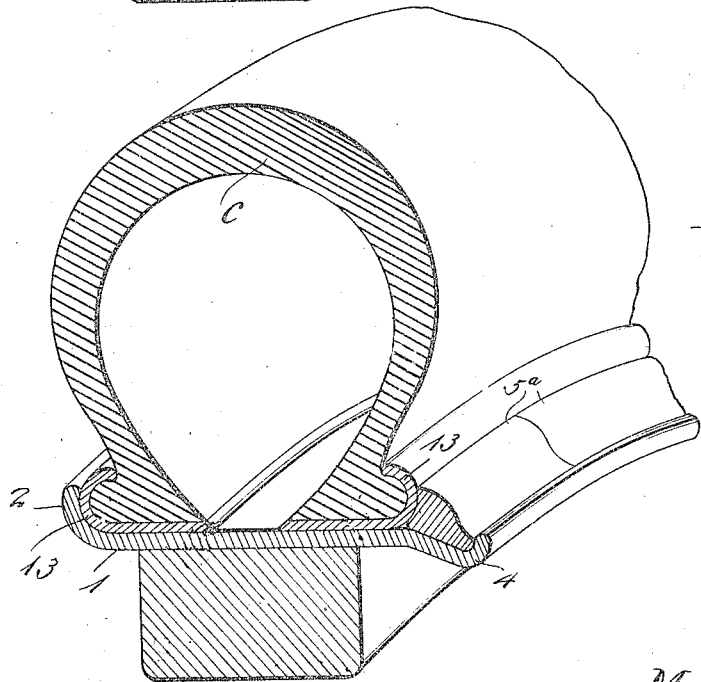
Witnesses
Inventor
M. J. Selzer
by H. B. Willson & Co.
Attorneys

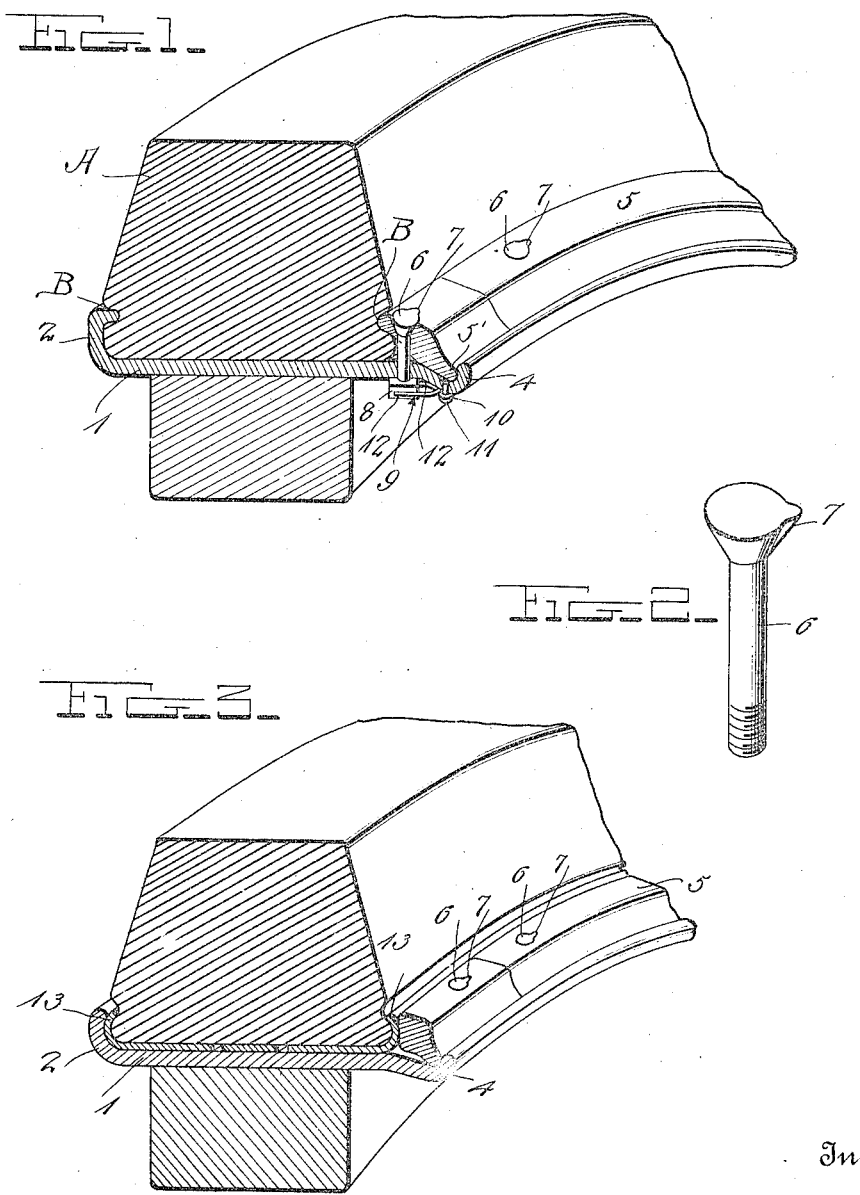

UNITED STATES PATENT OFFICE.

MICHEL J. SELZER, OF AKRON, OHIO.

WHEEL-RIM.

1,161,348.  Specification of Letters Patent.  Patented Nov. 23, 1915.

Application filed May 16, 1912. Serial No. 697,735.

*To all whom it may concern:*

Be it known that I, MICHEL J. SELZER, a citizen of the United States, residing at Akron, in the county of Summit and State of Ohio, have invented certain new and useful Improvements in Wheel-Rims; and I do declare the following to be a full, clear, and exact description of the invention, such as will enable others skilled in the art to which it appertains to make and use the same.

This invention relates to improvements in means for detachably securing tires to vehicle wheels and is especially designed for pneumatic and cushion tires.

The object of the invention is to provide simple and efficient means for reliably locking a tire in operative position and which may be readily and quickly applied and removed especially adapting the device for use on motor vehicles.

Another object of the invention is to provide a peculiarly constructed locking ring and rim for coöperating with each other to secure the tire in position.

With these and other objects in view the invention comprises certain novel constructions, combinations and arrangements of parts, as will be hereinafter more fully described and claimed.

In the accompanying drawings Figure 1 represents a detail perspective sectional view of one form of the invention applied to a solid cushion tire. Fig. 2 is a side elevation of one of the bolts for securing the locking ring in place. Fig. 3 is a detail perspective sectional view of a slightly different form or application of the invention to a solid cushion tire. Fig. 4 is a similar view of another form detached. Fig. 5 is a detail perspective sectional view of another form of the invention applied to a pneumatic tire.

In the embodiment illustrated in Fig. 1 the simplest form of the invention is shown in which a rim 1 constructed in accordance with this invention is used in connection with a solid rubber cushion tire without the use of any clencher rings. This rim 1 has one edge turned up to form a clencher flange 2 and the other side edge is inclined downwardly and outwardly and then turned upwardly to form a seat 3 and clencher flange 4 for a locking ring 5. This locking ring 5 which constitutes one of the essential features of the invention is here shown composed of two sections each having a plurality of securing bolts as 6 for fastening it to the rim as will be hereinafter described. These bolts 6 are preferably constructed as shown in Fig. 2 with a laterally extending lug 7 on the head thereof for engagement with the ring to prevent turning of the bolt when in operative position. This bolt is provided with the usual nut 8 with which is engaged a retaining spring 9. This retaining spring is preferably constructed of brass wire to prevent corrosion and the helix 10 thereof is held in fixed position on the rim 1 by a rivet 11. The arms 12 of this spring engage the opposite faces of the nut 8 and hold it against turning.

The solid rubber tire A is of usual construction with grooves B in its opposite sides near its base for engagement by the rim flanges, the flange 2 being here shown engaged with one groove and the locking ring 5 with the other. This ring 5 is here shown substantially diamond-shaped in cross section one edge 5' thereof being elongated and engaged with the hook-shaped clencher-like flange 4 of the rim while its diametrically opposite edge engages the groove in the tire A. The bolts 6 are passed transversely through this ring substantially midway of the width thereof and when the nuts are screwed tight the bolts draw the ring down into close engagement with the tire and rim as shown in Fig. 1.

As clearly shown in the drawings all the modifications of the invention contain a wheel rim carrying on one edge some means for engagement with one side of a resilient tire and on its other edge a downwardly or inwardly inclined portion terminating in an annular seat which is curved or rounded in cross section, said seat being formed by upturning said edge of the rim. All forms also contain a ring-like locking member composed of one or more parts and having its outer edge rounded to rock in said curved seat while its upper and inner edge is shaped to coact with the other side of the tire to retain the same in position on the rim.

In Fig. 3 a slightly different form of the invention is shown in which clencher rings 13 are shown in connection with the same form of rim and locking ring described above. The tire is of slightly different form and in applying it the tire is slipped on the rim simultaneously with the clencher rings 13, the locking ring 5 is then inserted as shown with one edge engaging the hook-like flange 4 of the rim and its opposite edge bearing on the adjacent clencher ring. The bolts 6 are then inserted in the apertures in said ring 5 and the nuts screwed on thereby drawing the locking ring down on the rim and firmly holding the clencher ring in place and the tire cannot creep because of the pressure exerted on its sides.

In Fig. 4 an auxiliary rim 14 is employed in connection with the rim 1 and locking ring 5 and is held or centered on clencher rim base by means of wedge-shaped rings 15. The wedge-shaped rings 15 are adapted to also perform the same function as the clencher rings 13 shown in Figs. 3 and 5 of the drawings, and are similar thereto in that respect. In Fig. 5 this improved rim is shown in connection with a pneumatic tire C of ordinary construction, the rim 1 and clencher rings 13 being the same as those above described, and the locking ring 5ᵃ being slightly different in cross-section, being here shown substantially triangular and formed of a split ring instead of in sections, no bolts being necessary with this form of locking ring, the apex of which engages the hook 4 of the rim and the base the clencher ring adjacent outer face of the clencher ring as shown.

I claim as my invention:

In a vehicle wheel, a removable rim having hook-like flanges to carry an inflated tire, a pair of wedge-shaped centering rings disposed beneath said removable rim, the outer side edges of said rings being hook-shaped to conform to the outline of the flanges of the removable rim, and a stationary rim with means for causing said wedge shaped rings to contact with the flanges on the removable rim to hold the same concentric therewith.

In testimony whereof I have hereunto set my hand in presence of two subscribing witnesses.

MICHEL J. SELZER.

Witnesses:
WILLIAM F. FOUSE,
GILBERT C. WALTZ.